United States Patent [19]

Ise et al.

[11] Patent Number: 4,627,362

[45] Date of Patent: Dec. 9, 1986

[54] AIR SLIDING DEVICE FOR WORK PALLETS OR THE LIKE

[75] Inventors: Yoji Ise; Minoru Kato; Keiichi Tachikawa, all of Tokyo, Japan

[73] Assignee: Kabushiki Kaisha Myotoku, Tokyo, Japan

[21] Appl. No.: 622,730

[22] Filed: Jun. 20, 1984

[30] Foreign Application Priority Data

Jun. 28, 1983 [JP] Japan .................. 58-116619
Sep. 30, 1983 [JP] Japan .................. 58-182249

[51] Int. Cl.⁴ .................. B60V 1/11; B60V 1/16; B61B 13/04; B61H 9/00
[52] U.S. Cl. .................. 104/23.2; 104/134; 104/119; 104/290; 180/125; 188/67; 188/356; 384/12; 384/16
[58] Field of Search .......... 104/23 FS, 134, 119, 104/290; 180/124, 125; 188/67, 356; 308/5 R, 3.5

[56] References Cited

U.S. PATENT DOCUMENTS

| | | | |
|---|---|---|---|
| 3,246,608 | 4/1966 | Cooper | 104/23 FS |
| 3,385,390 | 5/1968 | Guienne | 104/23 FS X |
| 3,516,361 | 6/1970 | Hart | 104/23 FS |
| 3,610,365 | 10/1971 | Maddox | 180/125 |
| 3,644,762 | 2/1972 | Eastham | 104/23 FS |
| 3,757,699 | 9/1973 | Wirth | 104/23 FS |
| 3,820,467 | 6/1974 | Burdick | 104/134 X |
| 3,827,364 | 8/1974 | Maison | 104/23 FS |
| 3,855,901 | 12/1974 | Girardi | 308/5 R X |
| 4,165,132 | 8/1979 | Hassan | 188/356 X |
| 4,441,571 | 4/1984 | Wood | 180/125 X |
| 4,470,578 | 9/1984 | Arvidsson et al. | 180/125 X |

Primary Examiner—Randolph A. Reese
Assistant Examiner—Scott H. Werny
Attorney, Agent, or Firm—Murray Schaffer

[57] ABSTRACT

An air assisted sliding device has a pallet supported on a base. The pallet has a recess provided on the periphery of its bottom surface in which a flexible tubular sealing member is mounted. The sealing member has a memory normally contracting it so as to be flat. An air passage communicates with the interior of the flexible sealing member so that compressed air can be fed to it. A groove is evenly provided on the bottom surface of the pallet within the bounds of the recess and a separate air passage for feeding compressed air or vacuum air is communicated with the groove so that the pallet may be provided with an air film of compressed air or may be stopped and a vacuum applied to attract the pallet to the base at a predetermined position on the base. A timing belt drive or an electromagnetic motor is used.

10 Claims, 10 Drawing Figures

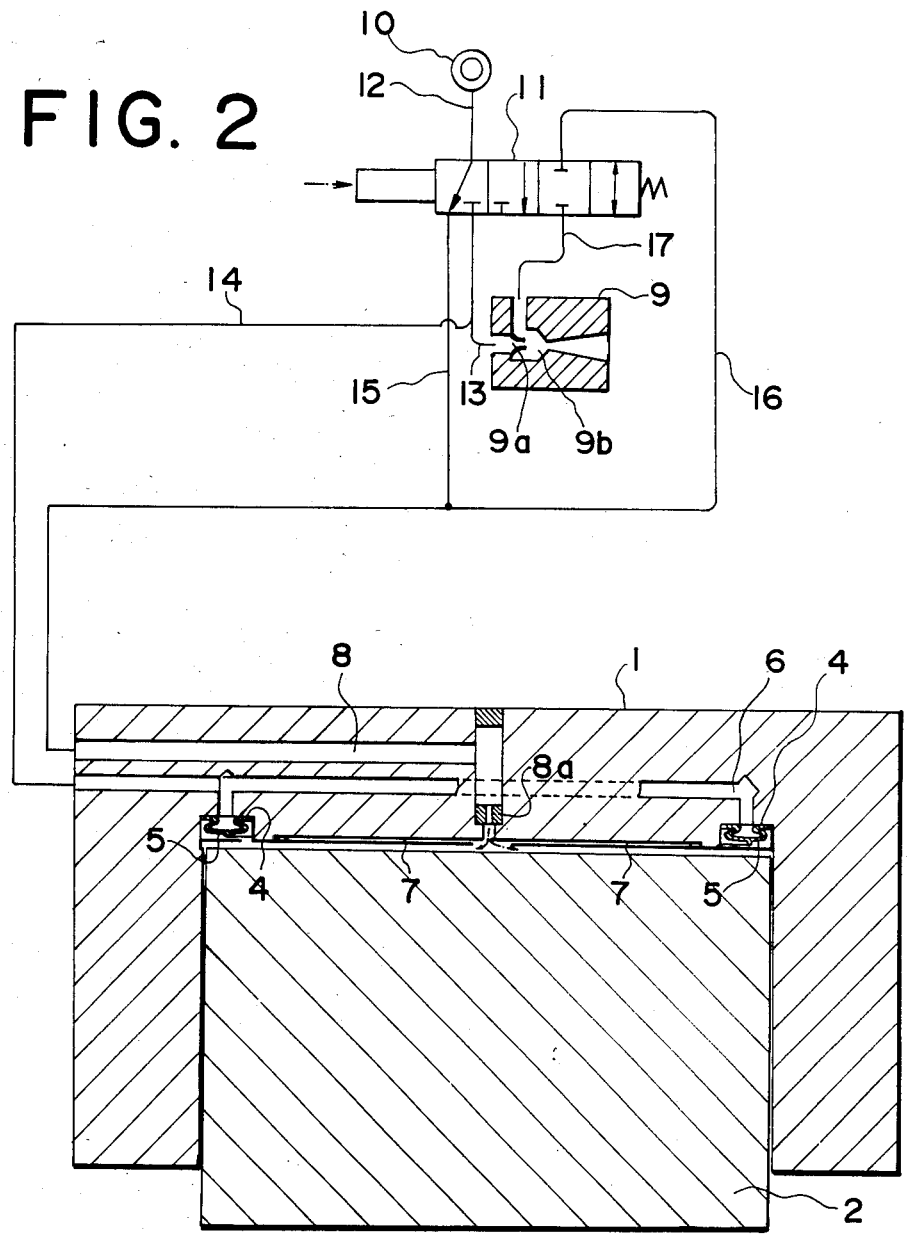

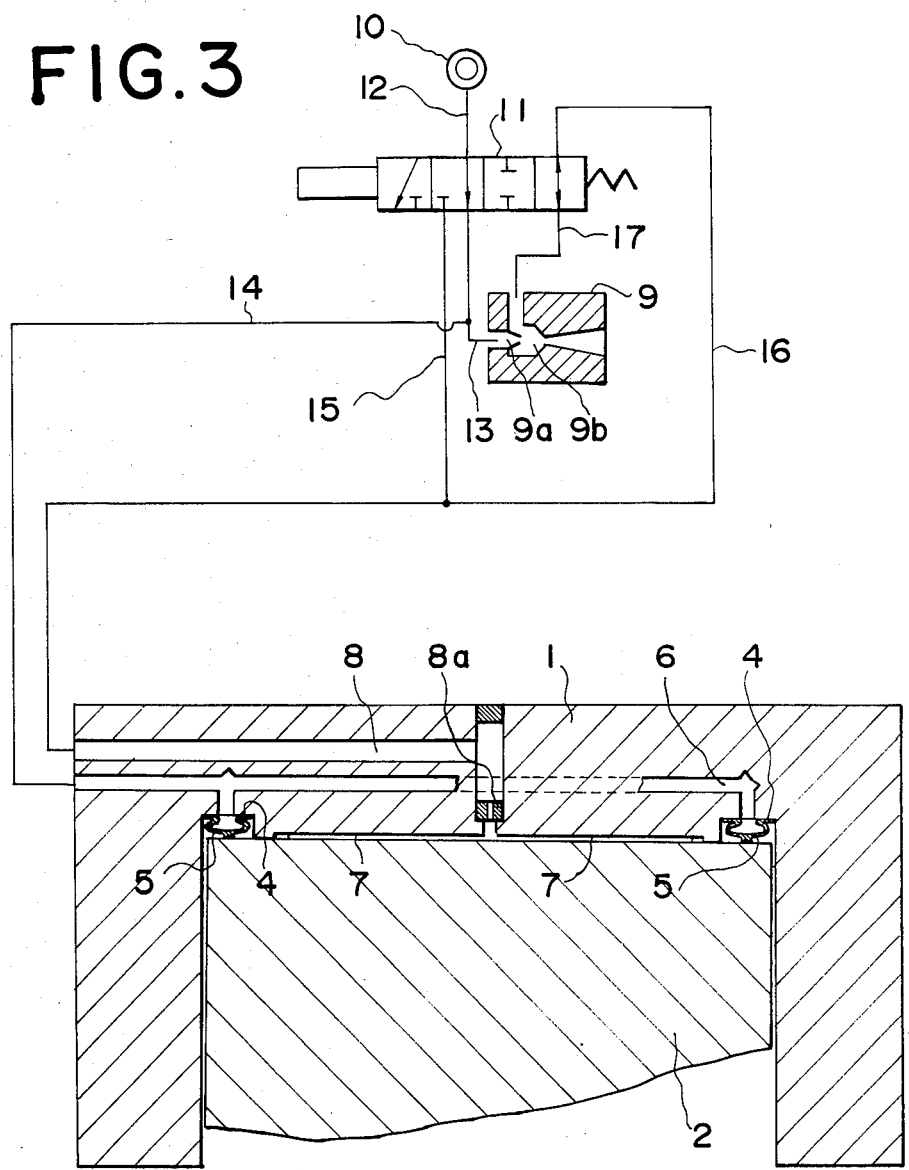

FIG. 9
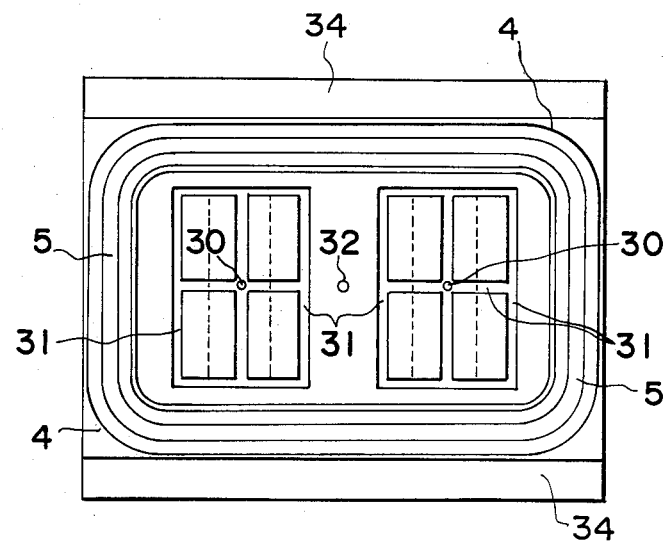
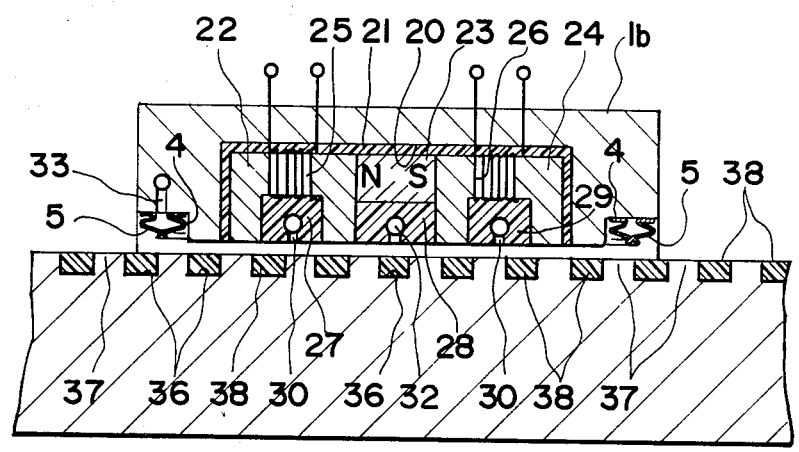
FIG. 8

AIR SLIDING DEVICE FOR WORK PALLETS OR THE LIKE

FIELD OF THE INVENTION

This invention relates to an air assisted device for pallets or the like wherein a pallet or assembling table can be moved by maintaining a noncontacting state and can be precisely stopped in a predetermined position. The present invention may be utilized for automatic machines, as well as to move tools, workpieces and work producing devices.

BACKGROUND OF THE INVENTION

In various automatic machines, it is necessary for a pallet or assembling table to be movable to any position and perfectly stopped in a predetermined position.

Electric motors or fluid cylinder motors are mostly used to accomplish movement but particularly with such conventional means it has been difficult to precisely stop the pallet or assembling table in a predetermined position.

The present invention eliminates such defects as are mentioned above and is so formed that a pallet on which a work, tool or work device is mounted is movable in a noncontacting state and is precisely stoppable in a predetermined position.

An object of the present invention is to provide an air film or cushion between the pallet and a base supporting the pallet thereby enabling frictionless non-contacting sliding movement of the pallet.

As a result, wearing of the sliding surface can be entirely eliminated and the sliding surface does not require lubrication. Further, the force required to slide the pallet may be so small that, for example, small high precision pulse motors can be used and the device can be made small and cheap. The pallet can be slid to a predetermined position, perfectly stopped by actuating a clamping device and maintained in a stopping state.

Further, in the present invention, a vacuum mechanism is adopted for the above mentioned clamping device. The vacuum mechanism is different from the conventional suction devices made of a flexible member and is so formed that the vacuum area may be larger enabling the suction of metal parts to each other so that such parts cannot be deviated from each other and cannot be easily moved with an applied external force.

The above mentioned conventional vacuum mechanisms, using a mere suction device requires an advancing and returning mechanism, are difficult to manufacture, is expensive and is difficult to maintain in a perfectly stationary state because the suction device is flexible. The present invention has as its other objects the provision of a system which overcomes such defects.

SUMMARY OF THE PRESENT INVENTION

The present invention is an air assist sliding device for moving pallets slidably supported on a base or the like wherein a recess is provided on the peripheral edge of the bottom surface of the pallet facing the base. A hollow expandable tubular sealing member, provided with a normally contracting memory so as to be normally flat, is arranged in the recess, and an air passage communicating with the interior of the sealing member is provided to supply compressed air to the interior of the tubular seal. Further a groove is evenly provided on the bottom surface of the pallet bounded by the recess and another air passage communicating with the groove is provided to supply suction thereto.

BRIEF DESCRIPTION OF THE DRAWINGS

FIG. 2 is a sectional view taken on line A—A of FIG. 1, including a schematic view of the pneumatic supply system, and showing the condition where the pallet is slidable;

FIG. 3 is a view similar to FIG. 2, showing the pallet in arrested condition;

FIG. 8 is a sectional view taken on line C—C of FIG. 6;

FIG. 9 is a bottom view of the work pallet of FIG. 5; and

DETAILED DESCRIPTION OF THE INVENTION

Figure 1:
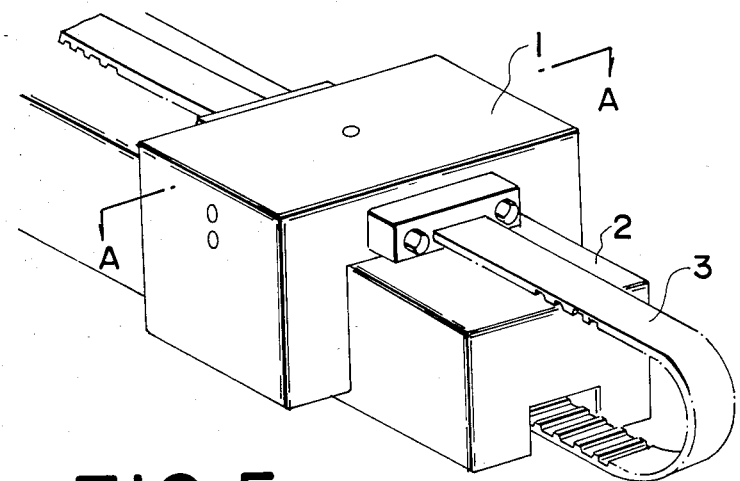
FIG. 1 is a general perspective view of one embodiment of the present invention.

As seen in FIG. 1, a work pallet 1 is provided to slidably move along an elongated base 2. The work pallet 1 is formed to be gate-shaped, i.e., in inverted U-shape having a flat top and a pair of depending legs, straddling the base 2 so as not to be swayed sidewise. The pallet is moved along the rail-like base by a timing belt 3. In use, a work fixture, tool or work device is mounted on the top surface of the pallet 1.

As shown in FIGS. 2 and 3, a recess 4 is provided about the entire peripheral edge of the bottom surface of the top of the pallet 1. A expandable hollow sealing member 5 closed at its lower end having a normally retentive contracting disposition so as to be generally flat is inserted in said recess 4. The flexible sealing member 5 is formed of rubber or plastics, and is slit along its length so as to be open on its upper edge, which is sealed to the recess 4, thus assuming a tubular shape. An air passage 6, extending through the pallet 1, connects the interior of the tubular flexible sealing member 5 with a source of air under pressure.

Figure 4:
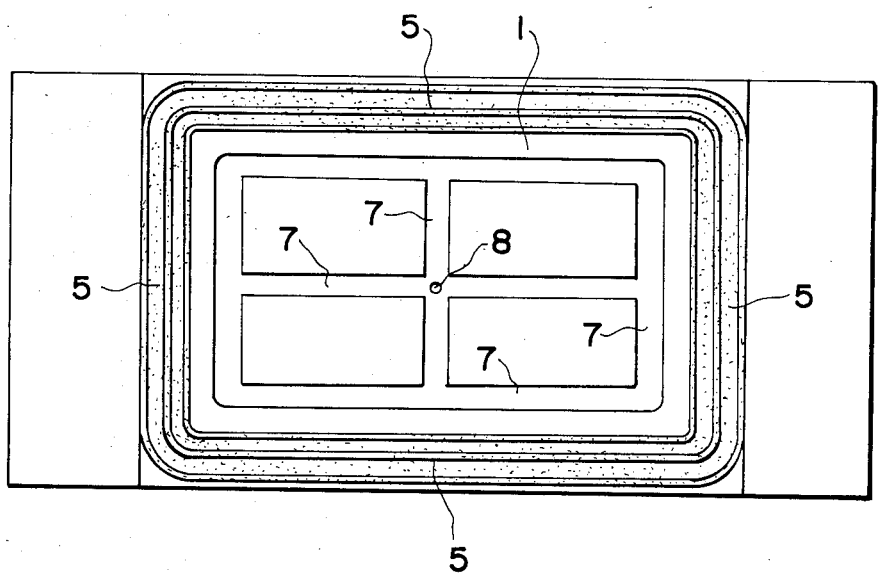
FIG. 4 is a bottom view of the work pallet of FIG. 1.
Figure 6:
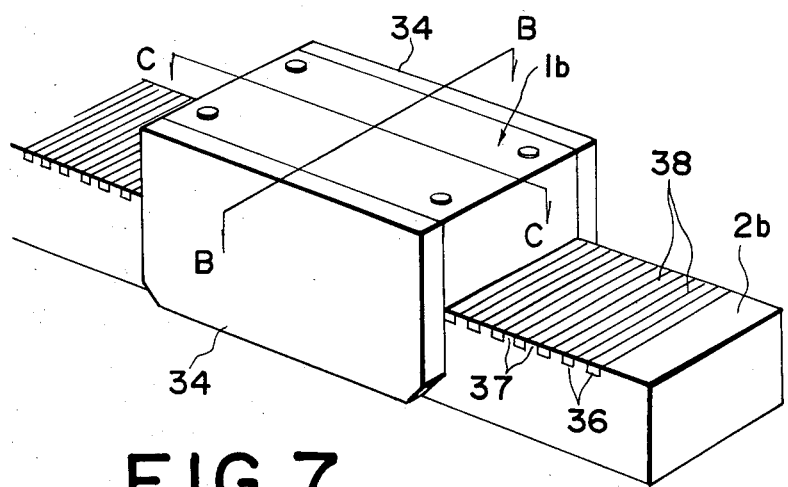
FIG. 6 is a perspective view showing another embodiment of the present invention.

As seen in FIG. 4 a rectilinear set of grooves 7 are uniformly formed on the lower surface of the pallet 1 within the area bounded by the peripheral recess 4. A second air passage 8 extends through the top of the pallet in communication with the groove 7, and is provided, if desired with an adjustable orifice 8a for varying the amount of air fed thereto.

The pallet 1 as shown in FIGS. 2 and 3 is connected to a control system comprising an ejector pump 9 by which compressed air jetted through a compressed air feeding nozzle 9a to maintain an internal partition or expansion chamber 9b under a negative pressure. A compressed air source such as a compressor 10, supplies air under pressure via a pipe 12, a switching valve 11 and a pipe 13 to the inlet 9a of the ejector pump 9.

A branch pipe 14 from the pipe 13 feeds air under pressure to the air passage 6 of the work pallet 1 from the switching valve 11, and a pipe 15 feeds air under pressure to the air passage 8 of the work pallet 1 from the switching valve 11. A pipe 16 provides for the return of air to the switching valve 11 from the air passage 8 of the work pallet 1. Lastly, a pipe 17 connects the switching valve 11 and the expansion chamber 9b of the ejector pump 9 with each other.

Movement of the pallet 1 in a non-contacting state along the rail in the above mentioned formation is described: When the switching valve 11 is switched to be in the state shown in FIG. 2, that is, to feed compressed air to the air passage 8 of the pallet 1, compressed air will be fed to the grooves 7 on the bottom surface of the pallet, from the compressed air feeding source 10, via pipe 12, switching valve 11, pipe 15 and air passage 8. As a result, the pallet 1 will be raised upward and floated on an air cushion, by about 3 to 5 microns. In this condition, air is not fed to the flexible sealing member 5 or to the ejector pump 9. Consequently, the flexible sealing member 5 will remain flat and contracted so as not to interfere with or prevent the pallet 1 from sliding freely along the base rail 2. The pallet 1 may be moved by using the timing belt 3 as shown in FIG. 1 or by utilizing other motive means such as a ball and screw, a rack and pinion, or a linear motor.

Stopping of the pallet 1 is described: When the above mentioned movement is stopped, the switching valve 11 is switched into the position shown in FIG. 3. As a result, compressed air will be no longer be fed to the grooves 7 and the pallet 1 will descend onto the base 2. Compressed air will, however, then be fed to the inlet nozzle 9a of the ejector pump 9 from the compressed air source 10 via piping 12, switching valve 11 and piping 13. Further, a part of the compressed air will be fed into the tubular flexible sealing member 5 through the piping 14 and air passage 6 causing the flexible sealing member 5 to be inflated so that it is pressed into contact with the base 2. At the same time, the compressed air fed to the inlet nozzle 9a of the ejector pump 9 places the internal expansion chamber 9b under a negative pressure. As a result, air in the grooves 7 will be withdrawn by suction through the pipe 16 and the air passage 8. Consequently, the pallet will be attracted to the base 2 until bottom surface of the pallet 1 makes firm fixed contact with the surface of base 2 and the work pallet 1 will be precisely stopped.

The above-mentioned vacuum contact is different from that of the conventional suction made by a flexible member. The contact area is larger and the metal surfaces of the pallet and the base rail are sucked into contact with each other so as not to be deviated from each other at all and not to be moved by any external force.

Figure 5:
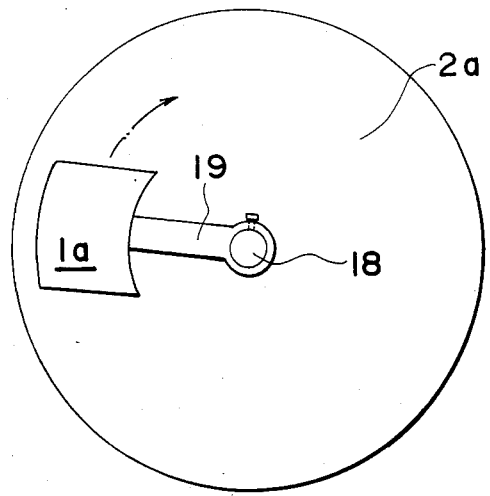
FIG. 5 is a plan view showing another embodiment of the present invention.

Another embodiment is shown in FIG. 5. Here a round table 2a is provided instead of the base rail and a work pallet 1a is rotatably mounted on the surface of the table 2a. In this embodiment, the pillar parts or depending legs on both sides of the gate-shaped pallet 1 (FIGS. 1 to 44) are eliminated, but the bottom surface of the pallet 1a is formed with a recess in which a peripheral seal is located and grooves as in the embodiment of FIGS. 1–4 and is similarly connected to a source of air and a control system and functions in the same way. An arm 19 extending from a rotary driving shaft 18, provided in the center of the table 2a, is connected to the work pallet 1a to effect movement of the pallet 1 as indicated by the arrow.

Figure 7:
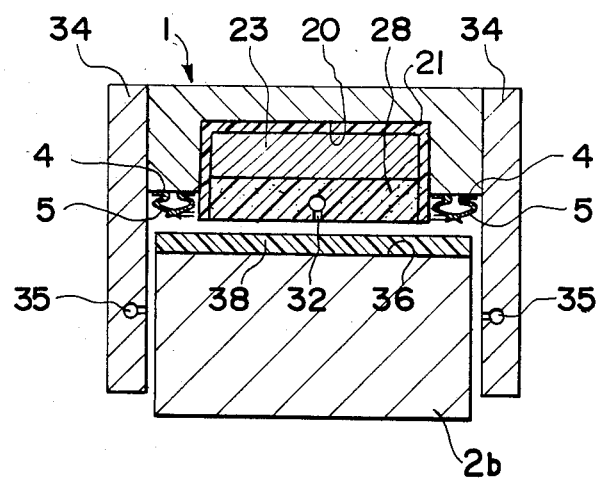
FIG. 7 is a sectional view taken on line B—B of FIG. 6.

Still other embodiments are shown in FIGS. 6 to 10. In the drawings, a pallet 1b is movably supported on an elongated base 2b. As shown in FIGS. 7 to 9, the lower surface of the pallet 1b is formed with a recess 20 into which is set a non-magnetic container 21 into which a plurality of iron cores 22, 23 and 24 are embedded so as to extend to the lower surface. The cores are provided with two-phase coils 25 and 26, and nonmagnetic inserts 27, 28 and 29 respectively forming the lower surfaces of the iron cores 22, 23 and 24. Air holes 30 for delivering compressed air open onto the lower surface of the pallet 1b, pass through the nonmagnetic inserts 27, and 29, and surround the iron cores. An air exhaust hole 32 for introducing a vacuum passes through the nonmagnetic insert 28. A hollow flexible sealing member 5 is provided in a recess 4 on the peripheral edge of the lower surface of the pallet 1b. The sealing member 5 expands and contracts with the feed and discharge of compressed air through an air hole 33. The above mentioned iron cores 22, 23 and 24 are arranged in series in the advancing direction of the work pallet 1 so as to contact with one another.

The grooves 31 are each connected to the air feeding holes 30 and are formed to be lattice-shaped so as to enclose the air feeding hole 30. The air suction hole 32 is positioned intermediately between the two air feeding grooves 31. The flexible sealing member 5 is shaped to be endless and encloses within it all of the above-mentioned grooves 31, air feeding holes 30 and air suction hole 32 on the lower surface of the pallet 1b. A guide plate 34 is fixed on each of the longitudinal edges of the pallet 1b. The inside surfaces of the guide plates 34 depend in opposition to both sides of the base 2b and is provided with an air passage 35 for feeding compressed air to form an air film between the inside surface of the guide plate 34 and the outside surface of the base 2b.

The base 2b is formed as a conductor having a plurality of parallel serrations comprising projections 37 and recesses 36 on its surface in the lengthwise direction. The projections 37 form a short-circuiting conductor as an inductor for a linear motor so that electricity may be short-circuited at both ends of the projection 37. The magnetic poles of the projections 37 are the stator, while iron cores 22, 23 and 24 and coils 25 and 26 form the rotor, configuring a linear induction type electromagnetic motor. Nonmagnetic member separators 38 are embedded in the recess 36.

The operation of such air sliding device is described:

First of all it will be understood that the device is provided with a source of compressed air and vacuum and a control system. The system shown in FIGS. 1–4 may be applied if desired. When compressed air is forcibly fed to the above mentioned air feeding holes 30 and grooves 31, from such compressed air source as a compressor, the pallet 1b is displaced from the base 2b by a predetermined distance since the compressed air will expand between the lower surface of the pallet 1b and the upper surface of the base 2b, causing the pallet 1b to float up by the air film formed between them. The expanded compressed air escapes out of the periphery of the lower surface of the work pallet 1b. Therefore, the pallet 1b will be maintained out of direct contact with the upper surface of the base 2b. At the same time, compressed air will be delivered under the same deliverying pressure to the air passages 35 and thus both guide plates 34 will also be kept out of contact with the sides of the base 2b.

When a two-phase alternating current is passed through the coils 25 and 26, a composite magnetic flux will move toward the coils 25 and 26 and, by a short-circuited current based on an electromotive force produced by the short-circuiting conductors created by projections 37. An electromagnetic force, by Fleming's left hand rule, will be produced between the short-circuited current produced by projections 37 and the magnetic flux produced by the coils 25 and 26 resulting in moving the pallet 1b horizontally. That is, the pallet 1b will be floated by compressed air and will be propelled by the force obtained by the liner induction motor action.

When the pallet has to be moved to a predetermined position and is to be stopping there, the feed of the compressed air to the air feeding holes 30 and grooves 31 and the current to the respective coils 25 and 26 are both stopped. Compressed air is then introduced into the hollow sealing member 5 through the air passage 33 to inflate the sealing member 5, so that it comes into close contact with the upper surface of the base 2b. The air captured within the area bounded by the sealing member 5 is then exhausted through the suction hole 32 by the ejector pump, or vacuum pump or the like. The space between the lower surface of the pallet 1b enclosed by the sealing member 5 and the upper surface of the base 2b will become a vacuum and the pallet will be tightly attracted to the base 2b. Thus the pallet 1b will be stably and positively held in the arrested position.

Figure 10:
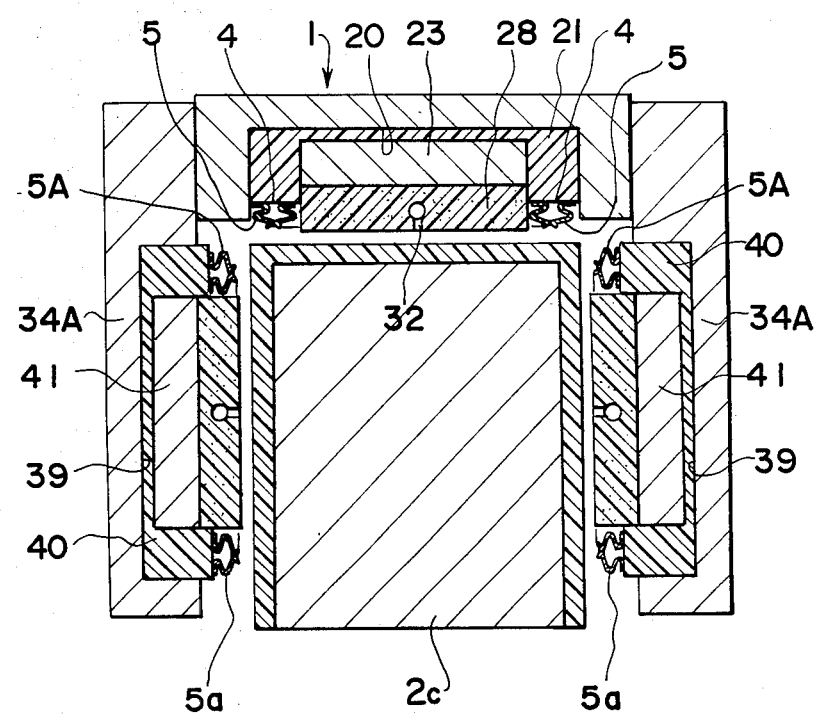
FIG. 10 is a sectional view showing another embodiment of the invention.

FIG. 10 shows still another embodiment wherein recesses 39 are provided respectively in the two side guide plates 34a overlapping the bases 2c. A plurality of iron cores 41 on which the coils such as are shown in FIG. 9 are set within the recesses 39 through a nonmagnetic member 40. Projections and recesses such as 34 and 36 as seen in FIGS. 6–9 are provided also on the sides 34a of the base 2c opposed to the end surfaces of the iron cores 41. The projections are short circuiting conductors and with the iron cores 41 having the coils such as 25 and 26 of FIGS. 6–9 wound on them, form a similar induction type linear motor. An endless sealing member 5a as already described is fitted to each of the peripheries of the surfaces opposed to the base 2c of the guide plates 34a so that compressed air can be fed to the sealing members 5a simultaneously with the above mentioned sealing member 5. Although not illustrated, air exhaust holes, acting the same as is described above are present on the sides of the guide plates 34a in communication with the space enclosed by the respective sealing members 5a.

In the embodiment of FIG. 10 three sets of linear motors and air sliding devices namely in each of the upper or top and both sides of the pallet are combined to obtain a sufficiently high torque propelling force and position holding force and to be effective to convey heavy works.

We claim:

1. Apparatus for precisely positioning a pallet support for tools and the like comprising
   (a) a fixed base member,
   (b) a pallet having an upper surface for said workpieces, tools, and the like and a lower surface in opposition to the upper surface of said base and defining therebetween a space, said pallet being movable horizontally and vertically relative to said base,
   (c) a recess formed in the lower surface of and extending about the peripheral edge of said pallet's lower surface surrounding the space defined between the surface of said base and the surface of said pallet, and
   (d) an expandable tubular seal member located in said recess about the entire periphery of said pallet's lower surface,
   (e) means for selectively supplying air under pressure to said seal member to expand said member into contact with the upper surface of said base member to seal and enclose said space, and
   (f) means for selectively supplying air under pressure in said space to provide an air cushion between said pallet and base member, also capable of selectively creating a vacuum in said space to attract said pallet to said base member.

2. The apparatus according to claim 1, including a source of air under pressure, a source of vacuum, and valve means for selectively supplying said air under pressure to said enclosed space and said seal member and for selectively supplying said vacuum to said enclosed space.

3. The apparatus according to claim 2, including conduit means extending through said pallet from said valve means to said enclosed space and said seal member.

4. Apparatus for precisely positioning a pallet supporting workpieces, tools and the like comprising
   (a) a fixed base member comprising a flat surface and an elongated guide rail having a flat surface,
   (b) a pallet having an upper surface for said workpiece, tools and the like slidably mounted on said guide rail and having a lower surface lying in direct opposition to the surface of said base, said pallet being displaceable over said guide rail toward and away from said surface of said guide rail, and
   (c) means for feeding air under pressure to the surfaces between said pallet and said guide rail to impose an air cushion therebetween, and
   (d) seal means extending about the peripheral edge of the lower surface of said pallet surrounding the space defined between the surface of said guide rail and the lower surface of said pallet, and an exhaust port communicating with the space surrounded by said seal means through which a vacuum may be applied causing said pallet to be attracted to said base and said seal means to sealingly enclose said space to hold said pallet in fixed position.

5. The apparatus according to claim 4, including means for moving said pallet comprising a motor means having a timing belt drive connected to said pallet.

6. The apparatus according to claim 4, including means for moving said pallet comprising an electromagnetic motor, said motor having stator and rotor on said guide rail and pallet respectively.

7. The apparatus according to claim 4, wherein said exhaust port is open on the upper surface of said pallet and extends through said pallet in connection with a source of vacuum.

8. The apparatus according to claim 5, wherein said seal means comprises a resilient tubular member secured on the lower surface of said pallet, said tubular member being expandable to selectively contact the surface of said base to enclose the space therebetween.

9. The apparatus according to claim 5, wherein said tubular seal means is located in a recess extending in said pallet about the periphery of the lower surface of said pallet.

10. The apparatus according to claim 9, including a source of air under pressure and means for selectively feeding said air under pressure to said tubular member.

* * * * *